Dec. 16, 1969          P. BERGONZO          3,483,776

AUTOMATIC LATHE AND METHOD FOR CONTROLLING SAID LATHE

Filed March 4, 1965          4 Sheets-Sheet 1

United States Patent Office 3,483,776
Patented Dec. 16, 1969

3,483,776
AUTOMATIC LATHE AND METHOD FOR
CONTROLLING SAID LATHE
Pierre Bergonzo, 117 Route de la Capite,
Cologny, Geneva, Switzerland
Filed Mar. 4, 1965, Ser. No. 437,154
Claims priority, application Switzerland, Mar. 13, 1964,
3,299/64
Int. Cl. B23b 21/00, 42/18; B23p 23/00
U.S. Cl. 82—21                                  6 Claims

ABSTRACT OF THE DISCLOSURE

An automatic cam controlled lathe having cam controlled tool slides, the amplitude of displacement of each slide being controlled by the maximum lift of the cam, the position of each slide being controlled by the angular extent of the cam and the feeding speeds of each slide being controlled by variable speed driving means determining the angular speed of rotation of the cams.

---

The present invention concerns automatic cam controlled lathes and more particularly an automatic single spindle lathe comprising machining posts constituated by tool holders carried by slides the displacements of which are mechanically controlled by means of actuating members or cams.

Furthermore, the present invention concerns more particularly but not exclusively automatic cam controlled lathes in which each reciprocative movement of each machining post is controlled by a distinct cam, all said cams being carried by only one rotative control station. Such an automatic lathe is for example described in the patent application No. 135,836 now Patent No. 3,203,287.

In the existing cam lathes each reciprocative movement of a working post is controlled either by a cam or by the lobe of a cam the form of which determines simultaneously the three characteristic parameters relative to this displacement of the working post that is:

(a) The amplitude of the movement of a working post which is determined by the maximum height of the lift of the cam.

(b) The duration or position of the machining operation with respect to the execution of one complete cycle of machining operations which is determined by the angular extent of the lift or active hundreds of the cam.

(c) The speed of displacement of the working post which is determined by the slope of the cam, the speed of rotation of said cam being constant and determined by the cinematic of the lathe and not by the particular machining operation.

When it is desired to modify one of the three above-cited parameters it is necessary to modify or to make again, that is to say to recalculate the considered cam. Further, in the existing lathes the modification or the replacement of one cam brings often, and almost always, with it the replacement of all the other cams relative to the same complete cycle of machining operations. In fact, if one machining operation is modified there are great chances that the new operation foreseen enters in conflict with one of the other intended machining operations. That is why it is nearly always necessary to replace the whole set of cams when one of them has to be modified.

Furthermore, it has to be noted that these three parameters are not independent the one from other. In fact, when the amplitude and the position of the feeding movement of one working post are given the speed of this displacement is also determined. In fact, theheight and the angular extent of the lift of the cam determines its slope. Practice has shown, that it is only very seldom possible to control the displacements of the working post in such a way that the feeding speed be optimum taking in account for the materials constituating the tool and the workpiece. In fact, the amplitude of the movement is a data depending from the shape of the workpiece and the position of the machining operation with respect to the complete cycle is fixed within certain limits determined particularly with respect to other machining operations of the same complete cycle. Consequently, the speed of the displacement of a working post is determined by the amplitude and the position of the working operation and can only be adjusted within a very narrow range of variations so that it is practically not possible to optimize this speed taking in account for the materials constituating the cutting tool as well as the workpiece.

It is thus evident, that the known lathes cannot be utilized in the optimum conditions what affects badly their productivity.

The present invention has for its object an automatic cam controlled lathe comprising machining posts constituated by tool holders carried by slides, and the displacements of which are mechanically controlled by cams driven in rotation. This automatic cam lathe tends to obviate to the precited drawbacks by the fact that the maximum height of the lift of each cam controls the amplitude of the displacement of the corresponding tool holder, that the angular extent or number of active hundreds of the lift of each cam controls the position of the working operation considered with respect to the complete cycle of machining and by the fact that it comprises a driving device driving the said cams in rotation at an angular speed determining in function of the machining operations to be done the feeding speeds of the said working posts.

The present invention has also for its object a control method of the feeding displacements of the machining posts of an automatic cam controlled lathe with respect to a complete cycle of this lathe which distinguishes itself by the fact of mechanically controlling the amplitude and the position with respect to the complete machining cycle of the displacement of a working post, whereas the feeding speed of the displacement of this working post is electro-mechanically controlled in an independent way from the amplitude and the position of the displacement of the said working post.

The attached drawing shows schematically and by way of example two embodiments of the present invention:

Figure 1:
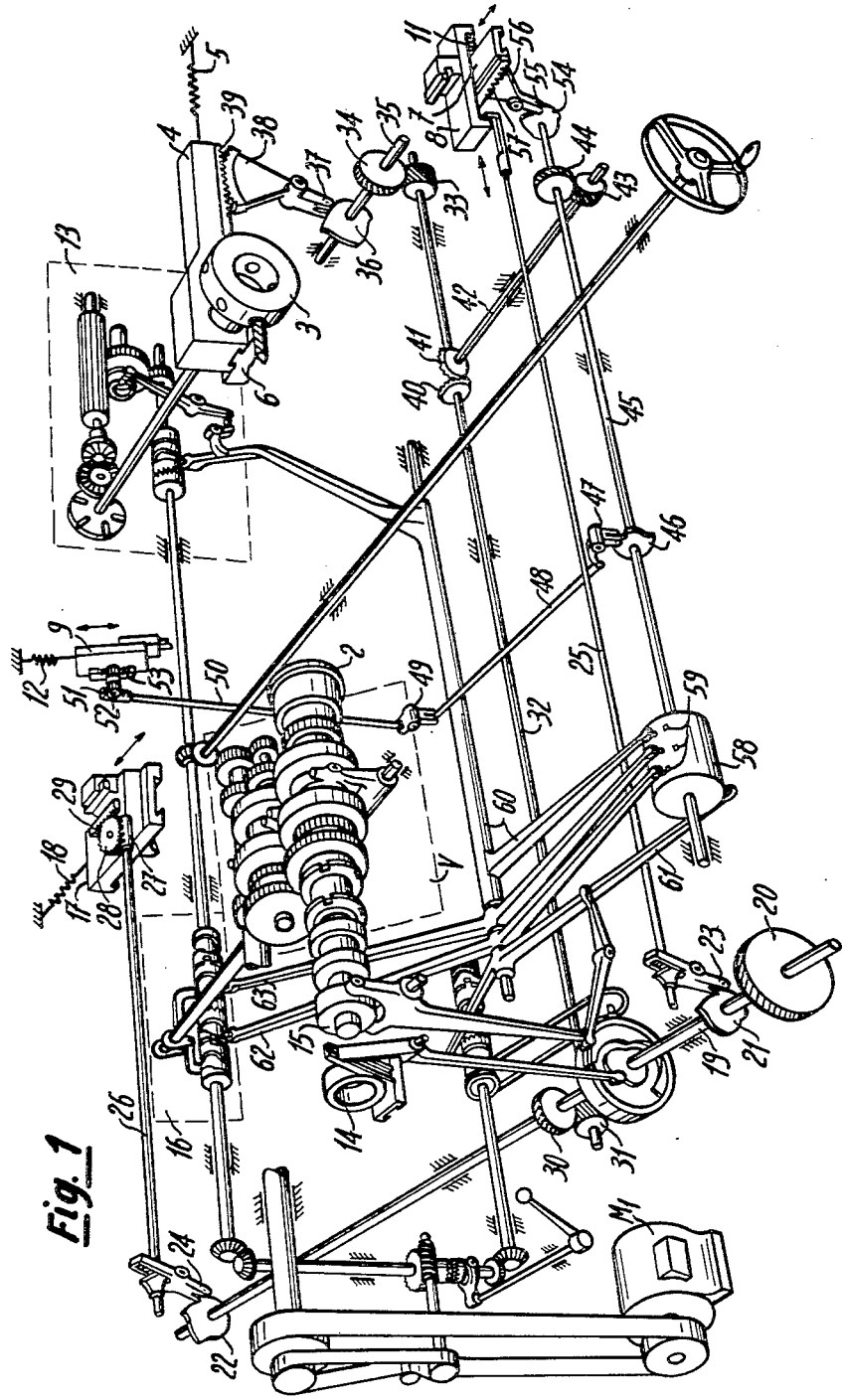
FIG. 1 is a diagram of the principle of the different mechanical linkages existing between the various members of a first embodiment of the lathe.
Figure 2:
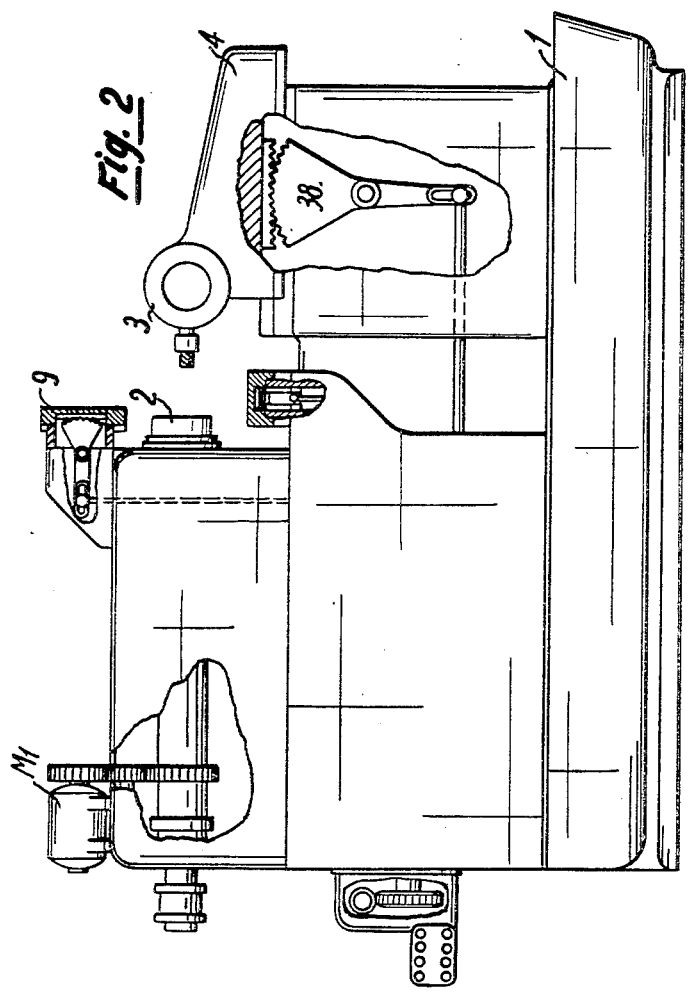
FIG. 2 is a view in elevation thereof certain parts being taken away or torn down.

The automatic lathe shown, provided with a control device according to the invention, comprises a frame 1 comprising a headstock in which a workpiece carrying spindle 2 is pivoted which is driven in rotation through the intermediary of a gearbox V by means of an electrical motor $M_1$. This automatic lathe is provided with a turret head 3 carried by a slide 4 subjected to the action of a return spring 5 tending to maintain it in rest position and sliding along slides 6 carried by the frame 1, with a cross slide tool holder for lathing and threading operations comprising a transversal slide 7 and a longitudinal slide 8 as well as with a radial tool holder carriage 9 for cutting or sectioning operations. The slide 7 as well as the two radial carriages 9 sliding along slides mounted on the frame 1, are subjected to the action of return springs 10, 11, 12 respectively tending to maintain them in a return or back position, far away from the axis of rotation of the workpiece carrying spindle 2 of the lathe.

This automatic lathe is further provided with auxiliary devices comprising an indexing device 13 of the turret head 3, a feed bar device 14, a clamping device 15 of the bar being worked on in view of its driving in rotation through the spindle 2 of the lathe, as well as a control mechanism 16 of the gear box V.

This automatic lathe comprises further a back carriage 17 maintained in return position by means of a return spring 18.

A first cam shaft 19 pivoted on the frame 1 of the lathe carries at one of its ends a driving wheel 20 intended to mesh with a worm of a driving device which will be described later on. This cam shaft 19 carries a cam 21 intended for controlling the longitudinal slide 8 and a cam 22 intended for controlling the back carriage 17.

These cams 21, 22 are mechanically connected to the corresponding tool holder carriages 8, 17 by the intermediary of feelers 23, 24 in contact with the corresponding cam, and transmission means 25, 26 the one directly attached to the carriage 8 and the other driving the carriage 17 in its displacements by means of a rack 27 driving a pinion 28 pivoted on the frame 1 and in mesh with a second rack 29 carried by the carriage 17.

The cam shaft 19 carries further a worm wheel 30 meshing with a second worm wheel 31 carried by the end of a countershaft 32 the other extremity of which carries also a worm wheel 33 meshing with a worm wheel 34 fast with the rear cam shaft 35. This rear cam shaft 35 carries a turret cam 36 mechanically connected to the front tool holder carriage 4 by means of a feeler 37, fast with a toothed sector 38 pivoted on the frame of the lathe and in mesh with a rack 39 carried by the said front tool holder carriage 4.

The shaft 32 carries further a pinion 40 with conical toothing meshing with a second pinion 41 with conical toothing mounted on a countershaft 42 bearing at its free end a worm wheel 43 meshing with a worm wheel 44 driving an auxiliary cam shaft 45.

This auxiliary cam shaft 45 carries a cam 46 mechanically connected to the radial tool holder carriage 9 by the intermediary of a feeler 47, transmission means 48, 49, 50 carrying a rack 51 in mesh with a pinion 52 pivoted on the frame 1 and meshing with a rack 53 carried by the said radial carriage 9. This auxiliary cam shaft carries further a cam 54 mechanically connected to the transversal slide 7 by the intermediary of a feeler 55 fixed with a toothed sector 56 pivoted on the frame 1 and in mesh with a rack 57 carried by the said transversal slide 7.

This auxiliary cam shaft 45 comprises further a control drum 58 carrying abutments 59 the position of which is angularly adjustable. Each of said abutments 59 cooperates with one of the levers 60, 61, 62 and 63 pivoted on the frame 1 of the lathe and mechanically connected to the indexing device 13 of the turret head 3 to the clamping device 15 and the feed bar device 14 as well as to the control device 16 of the gear box V respectively.

Up to that point the automatic cam lathe described is in every point similar to an existing lathe. It has however to be noted already that the cams 21, 22, 36, 46 and 54 controlling the different tool holder carriages are not as the ones of the existing lathes. As a matter of fact, these precited cames comprise each one or several lifts determining every feed displacement of the corresponding tool holder carriage. However, these lifts determine only the amplitude and the position of these feeding displacements with respect to the complete machining cycle. These cams do not control however the speed of these feeding displacements as it is the case in the existing lathes. This feeding speed is in fact controlled as it will be seen later on by the driving device.

This has as consequence, that the cams 21, 22, 36, 46 and 54 of the lathe are much easier to calculate and to execute than the one necessitated for the control of an existing lathe. In fact, the shape of the active profile or slope of the cam has no importance any more. The only parameters having to be respected being the amplitude and the number of active hundreds of the lift controlling respectively the amplitude of the displacement of the corresponding tool carrier carriage and the position of this displacement with respect to a complete machining cycle.

It has also to be noted that these two parameters, amplitude of the lift and number of active hundreds of it, are constant parameters for the fabrication of a piece of given shape. On the contrary, the speed of displacement of the tool depends on factors other than the shape of the piece to be machined, for example depends from the material, in which said piece is to be done. In a lathe of existing design it is necessary not only to have a set of cams which is different for each shape of workpiece but also to have sets of different cams to manufacture pieces of identical shape but made of different materials. On the contrary, in the present lathe only one set of cams enables the fabrication of all the pieces having the same shape.

As a consequence, it is to be seen that the cams of the present lathe are easier to realize and are of a more universal use than the one of the existing lathes.

Besides, from the original realization of the cams of the present lathe, this lathe distinguishes itself further through its driving device which drives the cam shafts in rotation. This driving device E (illustrated at FIG. 3) comprises a driving shaft 64 comprising at one of its free ends a worm 65 meshing with a driving worm wheel 20 fixed with the main cam shaft 19. A variable speed motor 66 drives this shaft 64 by the intermediary of a worm 67, a worm wheel 68 and an electromagnetic clutch 69 when said clutch is excited. This adjustable speed motor is of known type and is able through adjustment of its excitation to revolve at an infinity of different speeds. This motor 66 is in fact a motor having a continuous speed variation of the "Minitron" type of the firm "Schindler-Reliance."

A constant speed motor 70 drives also the driving shaft 64 through the intermediary of a worm 71 of a worm wheel 72 and of an electromagnetic clutch 73 when said clutch is excited.

The main cam shaft 19 is thus able to be driven in rotation either by means of the motor 66 at a speed determined as it will be described later on, or by the motor 79 at a rapid speed determined by the characteristics of the said motor 70. The motors 70 and 66 are fed by a power supply A–B (illustrated in one-wire scheme to simplify the drawing) the one directly and in a continuous way and the other one by the intermediary of the selection device $S_1$ determining for each phase of operation of the complete machine cycle an appropriated speed of the motor 66 and thus of the cam shafts.

This selection device of the speeds of rotation of the motor 66 comprises abutments 74 fixed on the periphery of a control drum T which is fast with the main cam shaft 19 controlling through the intermediary of a lever 75 the closure of a microswitch 76. The angular positions of these abutments 74 are such that the microswitch 76 is closed during a short time interval at each passage from a phase of operation to the next one of the complete machining cycle. In the example shown and described there are six successive machining phases in a complete machining cycle. Each of these phases comprises the feeding displacement of at least one of the carriages 4, 7, 8, 9, 17. At the end of each phase of the cycle of machining the microswitch 76 is closed what causes the excitation through the low power supply C–D of a relay $R_1$ during a short time interval, the short time excitation of this relay $R_1$ causes the actuation of an actuating arm 77. This arm 77 cooperates with the ratchet wheel 78 which is able to take as much angular positions as the complete cycle of machining operations comprises of distinct phases, each time that the relay $R_1$ is excited it causes the displacement of the arm 77 which causes in its turn the passage of the ratchet wheel 78 from one of its angular positions to the next. In a variant, the actuating arm 77 could be constituted by the plunger of an electro-magnet controlled by the relay $R_1$. This ratchet wheel carries the arm 79 of the selector switch the free end of which cooperates with contact blocks 80. The arm 79 of the selector switch is electrically connected to a pole B of the power supply whereas each block 80 of the selection switch is connected to the motor 66 by the intermediary of a potentiometer 89. The adjustment of these potentiometers determines the adjustment of the feeding of energy to the motor 66 and thus its speed of rotation. For each phase of operations the motor 66 is fed by another block 80 and thus by another potentiometer so that the speed of rotation of said motor for each phase of operations can be independently adjusted.

The driving device E comprises further a second selection device $S_2$ controlling the excitation of the electromagnetic clutches and enabling thus to choose which one of the motors 66 or 70 is mechanically connected to the main cam shaft 19 in order to drive the same in rotation.

This second selection device $S_2$ comprises dogs 81, the position of which is adjustable, associated to the electromagnetic clutch 73 as well as dogs 82, the position of which is also adjustable, associated tot he electromagnetic clutch 69 all being carried by the control drum T. The adjustable dogs 81 cause by means of a lever 83 the closure of a microswitch 84 during a short time interval feeding thus a relay $R_2$ when a commutator switch 85 controlled by this relay is in its position $a$. The adjustable dogs 82 cause by means of a lever 86 the closure during a short time interval of a microswitch 87 also fed by the relay $R_2$ when the commutator switch 85 is in its position $b$. The relay $R_2$ is fed by the lower power supply C–D. This relay $R_2$ actuates thus the commutator 85 each time it is excited. The relay actuates also a commutator switch 88 feeding according to its position $a$, $b$ one or the other of the electromagnetic clutches 73, 69 respectively through the high power supply A–B.

In this way each time the microswitch 84 is closed (dog 81) this causes the excitation of the electromagnetic clutch 73 coupling the motor 70 to the main cam shaft 19 whereas each time the microswitch 87 is closed (dog 82) this provokes the excitation of the electromagnetic clutch 69 coupling the motor 66 to the main cam shaft 19.

The dogs 81 and 82 are positioned on the control drum T in such a way that the approach feed strokes of the tool holder carriages are effectuated at great speed, the motor 70 driving the cam shaft in rotation, whereas the working feed strokes are effectuated at the desired working speed, the motor 66 driving the cam shafts. In a general way inside each phase of machining operations that is to say between two successive abutments 74 of the selection device $S_1$ a dog 82 is inserted, followed by a dog 81 of the selection device $S_2$.

The working of the automatic lathe described is similar to the one of an existing lathe of similar type. However the cams of the described lathe control the amplitude of the displacements of the tool holder carriages as well as the position of these displacements with respect to a complete cycle. In fact, the speed of these displacements of the tool holder carriages is controlled electrically by means of the potentiometers 89 regulating the speed of the motor 66 and thus the angular speed of the cams controlling the said carriage.

During the setting in function of the automatic lathe for a new cycle of machining the cam shaft 19 is driven at great speed through the motor 70 the electromagnetic clutch 73 being excited as described here above. The position of the arm 79 of the selector switch is such that is selects the speed of the motor 66 relative to the first phase of operations of the cycle.

The tool holder carriages having to be driven during this first phase of operations of the cycle are thus first displaced rapidly under the action of the lift of their respective cams, then, the approach stroke being terminated, a dog 82 actuates the microswitch 87 causing the actuation of the commutator switches 85 and 88 and thus the excitation of the electromagnetic clutch 69 and the deenergization of the electromagnetic clutch 73 so that the cam shaft 19 is then driven in rotation by the motor 66 at the selected speed for that first phase of operations. The tool holder carriages actuated during this first phase of operations are thus displaced in their working strokes at their desired working speed.

Then when the feed stroke of these carriages is terminated they come back individually under the action of their return spring in retracted position. Then when all the tool holder carriages displaced during this first phase of operations have terminated their feed stroke a dog 81 causes the closure during a short time interval of the microswitch 84 causing the actuation of the commutator switches 85 and 88 and thus the energizing of the electromagnetic clutch 73. The cam shaft is then again driven at great speed through the motor 70.

At last, a dog 74 causes the closure for a short time interval of the microswitch 67 and the energizing for a short time of the relay $R_1$ what causes the arm 79 of the selector switch to advance of one step and thus causes the selection, by a second potentiometer 89, of the speed of the motor 66 relative to the second phase of operations. The phases of operations follow one another in such a way until the end of the machining cycle.

On top of the already cited advantages this new actuating device E enables an optimization of the feed speeds through practical tests which is the only way to determine the optimum speeds and thus to reduce the production time to a minimum. In fact, to search the optimum speed relative to one phase of operations of the machining cycle it suffices to proceed to tests in varying the position of the potentiometer 89 relative to this phase of operations. This is absolutely capital and enables not only to realize the optimization of the machining cycle very rapidly but also enables to be dispensed with the realization of several sets of cams what was necessary until now.

The present invention has been described in this first embodiment with reference to a cam lathe of traditional conception.

It is however possible in a variant of this first embodiment to replace all or part of the cams 21, 22, 36, 46 and 54 by discs fixedly secured on the corresponding cam shaft and driven in rotation by the same. Each of these discs would then carry on one of its frontal faces one or several cams intended to cooperation with corresponding feelers 23, 24, 37, 47 and 55. In that way it is possible to have one cam for each displacement of a machining post. This is particularly interesting for the front tool holder carriage 4. In fact, it is thus possible to suppress the turret cams with many lobes and to replace each lobe of them by a proper flat cam. Such a variant is similar to the variant of the lathe described and illustrated with reference to FIGURES 12 and 13 of the patent application No. 135,836 and will therefore not be described in further detail here.

Figure 3:
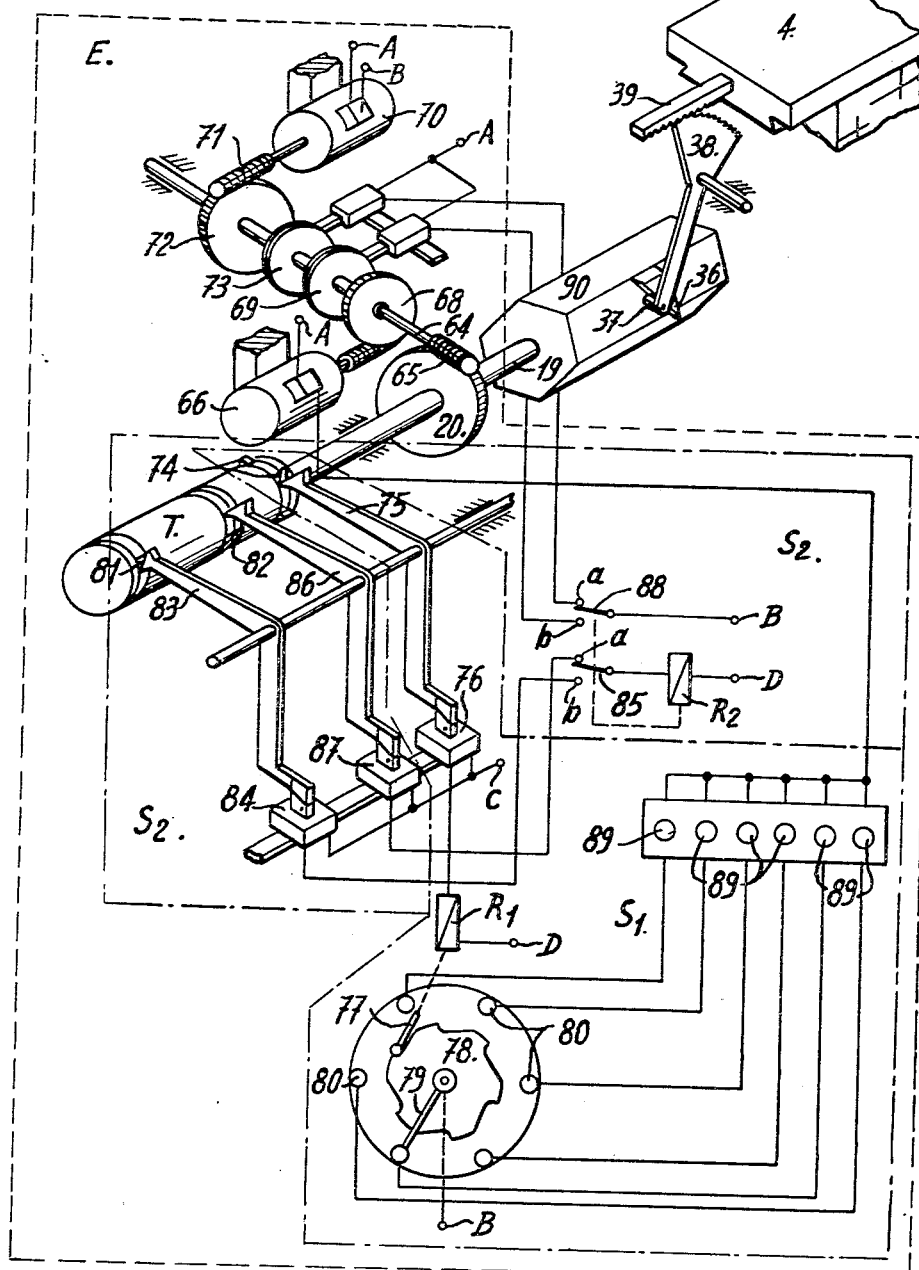
FIG. 3 is a schematic electro-mechanical diagram of a control device according to the invention.
Figure 4:
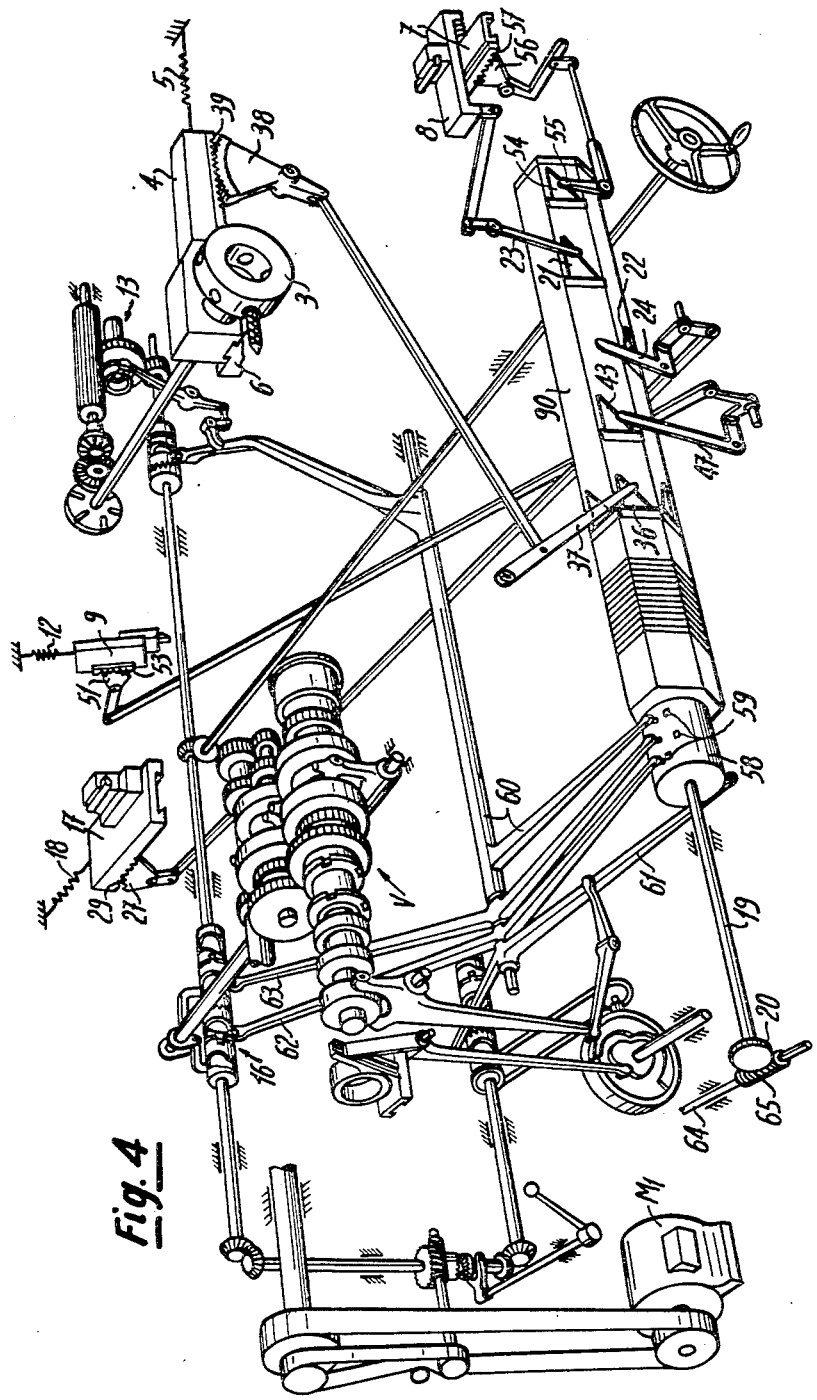
FIG. 4 shows a diagram similar to the one of FIG. 1 but for a second embodiment of the lathe.

The second embodiment illustrated at FIGURES 3 and 4 shows that the invention can be applied to a lathe of modern design such as the one described in the patent application No. 135,836. In this second embodiment all the tool holder carriages 4, 7, 8, 9, 17 of the lathe are actuated by cams carried by a unique control post 90 driven in rotation by the main cam shaft 19. This control post is polygonal in shape and carries on each of its faces the cams corresponding to the displacements of the tool holder carriages having to be actuated during one of the phase of operations of the complete cycle of machining. There is thus obtained a control post comprising a number of cams equal to the number of displacements of the machining posts during the complete cycle. Therefore to realize the same machining cycle with the first embodiment described and the second one there have to be as much cams in that second embodiment as the total number of lifts of the cams of the first embodiment.

In this second embodiment if a tool holder carriage is actuated once during the complete machining cycle it has one corresponding cam placed on the face of the control post corresponding to the machining phase during which this carriage has to be actuated. If however a tool holder carriage has to be actuated several times during a complete cycle it has as much corresponding cams as the number of its displacements.

All the cams associated to the different tool holder carriages having to be displaced during a same phase of machining are thus placed on the same face of the control post. On the contrary, all the cams relative to successive displacements of a same tool holder carriage are disposed on a same section of the control post, each on a different face of said control post.

Besides, the control linkages of these carriages which evidently depend on the new disposition of the cams, the other elements of the lathe are identical to the one described in the first embodiment of the invention.

In this second embodiment the actuating device is identical to the one described previously. The unique control post 90 is pivoted on the frame 1 of the lathe and is driven in rotation through the main cam shaft 19. As in the first embodiment described this main cam shaft 19 is driven in rotation by the actuating device E by means of the worm 65 meshing with the worm wheel 20 fastened on the cam shaft 19 and thus with the control post 90. The working of the lathe is also the same and will not be described here.

One schematical embodiment of the actuating device E has been described by way of example but it goes without saying that numerous variants are possible. In fact, equivalent technical solutions could be utilized to obtain the same effect, that is to say the driving of the main cam shaft of a lathe at different well determined speeds for each phase of operations of a complete machining cycle.

The present invention has further for its object a control method of the feed displacements of the working posts of an automatic cam controlled lathe relative to a complete cycle of machining. This method distinguishes itself by the fact of controlling mechanically the amplitude and the position with respect to a complete machining cycle of the displacements of the machining posts and of controlling electro-mechanically and independently from the amplitude and the position of the displacement of the said working posts the speed of displacement of these machining posts.

This method consists thus no longer to control the three parameters of a displacement of a working post by means of only one device, for instance one or several cams in the existing lathes, but to dissociate the control of the two parameters amplitude and position with respect to the cycle of machining of a displacement of the machining posts which depend only from the shape of the workpiece from the control of the parameter speed of displacement of the working posts depending from factors having nothing to do with the shape of the workpiece.

This dissociation of the control of the parameters of the displacement of the working posts enables to realize a lathe which adapts itself very easily to the execution of very different works without being necessary to proceed to long and complex adjusting and setting operations of the lathe and to decrease the dead times of a machining cycle to a very great extent.

I claim:

1. An automatic cam controlled lathe comprising: cams driven in rotation by at least one cam-shaft and each mechanically connected to a tool-holder for the control of their displacements in which the amplitude of the forward displacement of the tool-holders is determined by the lift of the corresponding cam; the positioning of said displacement in a machining cycle being determined by the angular position of said cam on the cam-shaft as well as by the angular extent of said cam, the speed of displacement of said tool-holder being controlled by the angular speed of displacement of said cams, means for rotating said cam-shaft at a first constant speed when said tool-holder is approaching its working position, variable speed drive means for rotating said cam-shaft at a successive series of preselected speeds depending upon the working position of the tool-holder in its machining cycle, and potentiometer means for controlling the speed of rotation of said variable speed drive means.

2. An automatic cam controlled lathe comprising: tool-holder slides, the displacements of which are mechanically controlled by means of cams driven in rotation by at least one cam-shaft, the amplitude of the displacement of each tool-holder slide being controlled by the height of the lift of the corresponding cam, the timing of this displacement in a complete machining cycle being controlled by the angular position of this cam with respect to the cam-shaft as well as by the angular extent of the active profile of said cam, a device for driving the cam-shaft in rotation at a successive series greater than two of preselected speeds, said driving device including two motors driving alternatively said cams in rotation at high and at lower variable speeds, respectively, as well as a first selection device for determining for each phase of a cycle of machining operations the speed of rotation of the variable speed motors, and a second selection device for determining which motor is coupled at a given instant to the cam-shaft driving said cams in rotation.

3. An automatic cam controlled lathe as claimed in claim 2 which comprises a control drum driven in rotation by said cam-shaft, said drum bearing angularly adjustable abutments and dogs for controlling said first and second selecting devices respectively, during the complete machining cycle, said first selecting device comprising a plurality of potentiometers for adjusting the speed of the variable speed motor, the number of said potentiometers being equal to the number of tool-holder slides.

4. Control means for controlling the cycle of operation of a machine tool having a plurality of tools successively engageable with a workpiece, the control means comprising a rotatable member, means for rotating the member about an axis at different angular speeds, said means comprising a variable speed motor and a first selecting device, the member having a first portion having a polygonal outer periphery comprising a plurality of flat outer surfaces each disposed in a plane parallel to said axis, cam means having elongated cam tracks thereon, support means mounted on each of a plurality of said surfaces, means mounting the cam means on said support means for adjustive sliding movement of said cam means on and relative to said surfaces and each other, said member having a second portion carrying angularly adjustable abutments for controlling said first selecting device, said first selecting device comprising a number of potentiometers equal to the number of faces of said first portion of said member, said potentiometers providing adjustment of each of said different speeds of the variable speed motor, follower means for controlling said tools according to the shape and location of said cam tracks, and means mounting said follower means for contact with and movement relative to said cam tracks.

5. Control means as claimed in claim 4 in which said means for rotating the member further comprises a high speed motor and a second selecting device, said second portion of said member carrying angularly adjustable dogs, clutch means controlled by said dogs for alternatively coupling said high speed motor and said variable speed motor to said member.

6. A machine tool having a plurality of first tools simultaneously engageable with a workpiece and a plurality of second tools successively engageable with said workpiece, and control means for controlling the cycle of operation of the machine tool, the control means comprising a rotatable member, means for rotating the member about an axis at different speeds, said means comprising a high speed motor and a variable speed motor, clutch means alternatively coupling said high speed and said variable speed motor to said member, a first portion of said member having a polygonal outer periphery comprising a plurality of flat outer surfaces each disposed in a plane parallel to said axis, cam means having elongated cam tracks thereon, support means mounted on each of a plurality of said surfaces, means mounting the cam means on said support means for adjustive sliding movement of said cam means on and relative to said surfaces and each other in a plane parallel to said surfaces, a second portion of said member carrying angularly adjustable abutments and dogs for respectively controlling a first selecting device for controlling the different speeds of said variable speed motor and a second selecting device for controlling said clutch means, said first selecting device comprising potentiometers the number of which is equal to the number of faces of said first portion of said member, for adjustment of said speeds of said variable speed motor, first follower means for simultaneously controlling said first tools according to the shape and location of said cam tracks, there being a first series of cam means comprising a plurality of said cam means spaced apart along a said outer surface in a direction parallel to said axis, means mounting said first follower means for simultaneous contact with and movement relative to the cam tracks of said first cam means, second follower means for sequentially controlling said second tools according to the shape and location of said cam tracks, there being a second series of cam means comprising a plurality of said cam means spaced apart peripherally about said member, and means mounting said second follower means for contact with and movement relative to the cam tracks of said second series of cam means.

References Cited

UNITED STATES PATENTS

| 2,054,018 | 9/1936 | Gilchrist | 77—32.8 XR |
| 737,974 | 9/1903 | Todd | 29—64 XR |
| 2,105,913 | 1/1938 | Fritzsch | 82—21.2 |
| 2,390,589 | 12/1945 | Holmes | 82—21.2 XR |
| 2,587,312 | 2/1952 | Greene | 29—64 |

FOREIGN PATENTS 956,084   4/1964   Great Britain.

LEONIDAS VLACHOS, Primary Examiner

U.S. Cl. X.R.

29—64; 77—32.8